UNITED STATES PATENT OFFICE.

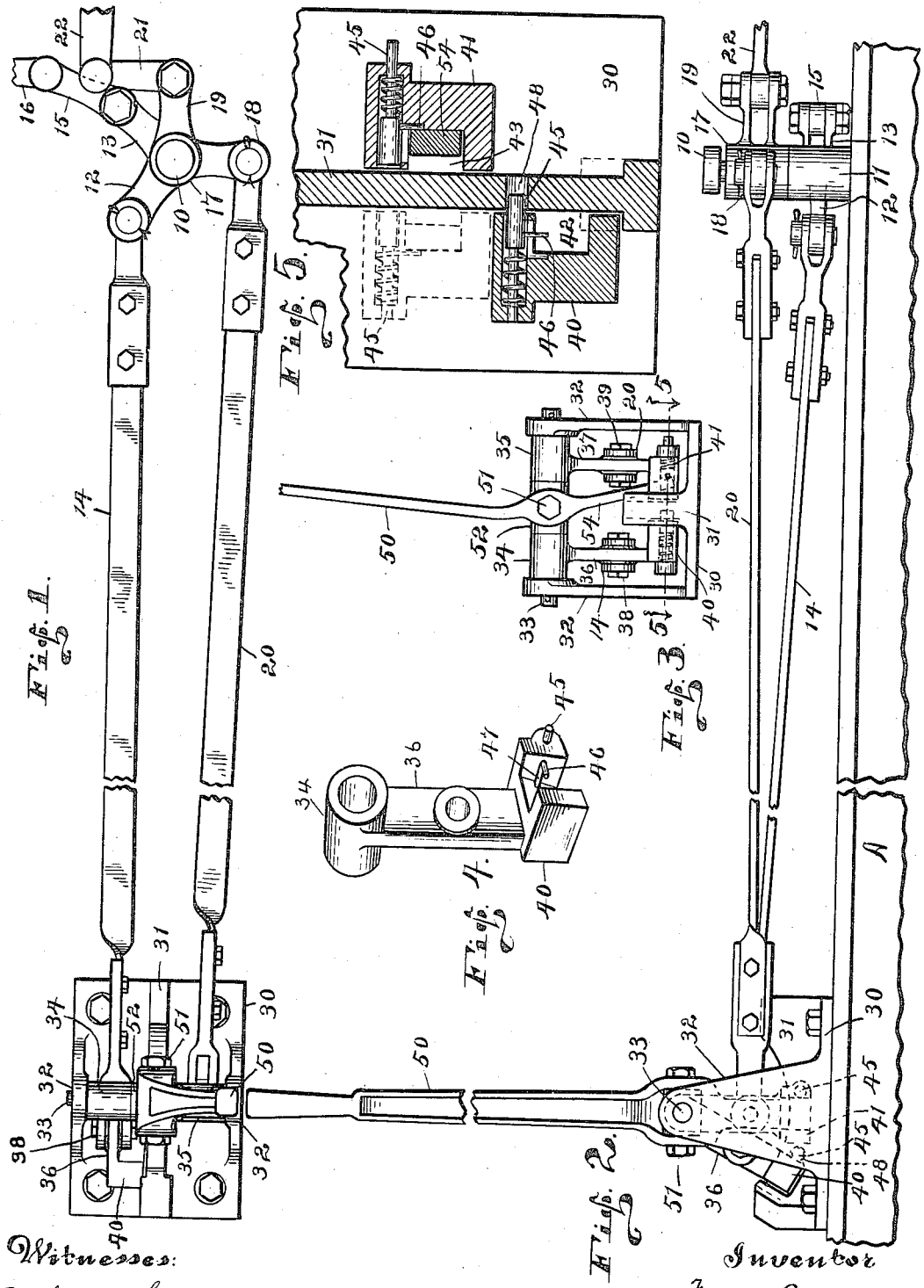

FRANK LAND, OF RICHMOND, INDIANA, ASSIGNOR, BY MESNE ASSIGNMENTS, TO M. RUMELY COMPANY, OF LAPORTE, INDIANA, A CORPORATION.

CONTROLLING MEANS FOR TRANSMISSION MECHANISM.

1,050,957.  Specification of Letters Patent.  Patented Jan. 21, 1913.

Application filed March 25, 1911. Serial No. 616,797.

*To all whom it may concern:*

Be it known that I, FRANK LAND, a citizen of the United States, residing at Richmond, in the county of Wayne and State of Indiana, have invented certain new and useful Improvements in Controlling Means for Transmission Mechanism, of which the following is a specification.

In the operation of traction engines employed for plowing, hauling and general agricultural work it is of importance that the transmission gearing thereof be capable of being readily controlled, so that the speed and pulling power of such engines may be increased and decreased, the immediate stopping of the structure effected, and the direction of motion thereof quickly reversed.

The object of my invention is to provide a simply operable and efficient mechanism by which a plurality of friction clutches forming part of a transmission gearing for traction engines may be controlled by the manipulation of a single lever arranged within convenient reach of the operator, and readily shifted into and out of frictional engagement with their respective driving disks.

In the accompanying drawings, which form a part hereof, Figure 1 is a plan of my improved friction clutch controller; Fig. 2 a side elevation thereof; Fig. 3 a rear elevation of the shifting lever and associated parts; Fig. 4 a perspective of a portion of the structure shown in Fig. 3; and Fig. 5, is a horizontal sectional view on the dotted line 5—5 in Fig. 3, showing locking mechanisms with which said lever is adapted to engage.

In said drawings the portions marked 10 indicate a post suitably mounted on the frame, A, of a traction engine, and upon which post is pivoted a bell-crank lever, 11, 12, 13, to the arm 12 of which a connecting rod, 14, is pivotally connected. To the arm, 13, of said bell-crank lever is secured a link, 15, which in turn communicates with an operating rod, 16, (shown in fragment) which at its opposite end is designed to be connected to a shipper (not shown) pivotally secured to a friction clutch. Above said bell-crank lever I mount a similar lever, 17, 18, 19, to the arm 18 of which I pivotally secure a connecting rod, 20. To arm 19 is secured a link, 21, communicating with the arm, 22, of a shipper (not shown) designed to be pivotally connected to a friction clutch remote from that with which said rod 16 is adapted to operate. Said rods 14 and 20 lead to a lever supporting and operating frame structure comprising a suitable base, 30, embodying a preferably concave dividing wall, 31, which base is designed to be secured to frame A by bolts or otherwise, and said base supports upright brackets, 32, connected by a pin, 33. Upon said pin 33 collars 34, 35, are mounted, each having an arm, 36, 37, depending therefrom, to which arms the rods, 14 and 20, respectively, are connected by pivots, 38, 39. At the lower ends of said arms are recessed members 40, 41, which abut against wall 31, the recessed portions thereof forming sockets, 42, 43, for the insertion of the end of lever 50. Said members are also provided with automatic locking pins, 45, preferably spring mounted, carrying shifting arms, 46, which project through slots, 47, into said sockets, said pins being adapted to engage wall 31 by entering an aperture, 48, therein. Said lever 50 is pivotally mounted, by means of a bolt, 51, or otherwise, upon collar, 52, supported by said pin 33, the lower portion 54 of said lever extending downwardly so that its end will enter either of the sockets 42, 43.

In the operation of my improved controller, assuming that both members 40, 41, are in directly opposite positions on each side of the dividing wall 31 as that occupied by member 40 (shown in full lines in Fig. 5), the bell-crank levers have been so adjusted, through rods 14 and 20, as to unclutch the mechanisms communicating with the connections 16, 22, and said members 40, 41, being locked to wall 31, said rods 14, 20, and their associated mechanisms, are maintained in fixed position. In this condition, the lever 50 is thrown forward so that its lower end 54 has been withdrawn from whichever of the sockets 42, 43, it has been inserted in, and is then swung laterally so that its end 54 will lie over the concave wall 31, and the lever including its lower end thus brought into substantially vertical position and free from engagement with either members 40, 41, and occupying a neutral position therebetween. When it is desired to operate the clutch mechanism communicating with rod 20, through the bell-crank lever connecting them, lever 50 is swung forwardly, then laterally and reversed rearwardly, so that its lower end 54 will enter socket 43, displacing arm 46, which latter shifts locking pin 45 out of engagement with wall 31, when said member 41 may be advanced along wall 31 by pulling upon lever 50, thus projecting rod 20 and transmitting motion through bell-crank lever 18, 19, and link 21, to shipper connection 22 for operating the clutch mechanism communicating therewith. As will be readily understood, by reversing the motion of lever 50, member 41 will be shifted to its original position so that locking-pin 45 will register with aperture 48 and limit the further movement thereof, and the motion of rod 20 connected thereto and its associated parts will be accordingly reversed. To operate the opposite system of mechanisms lever 50 is shifted laterally in the manner heretofore described so that its end will engage socket 42, when member 40 and its associated parts may likewise be adjusted. In this manner I am enabled to employ a single element for adjusting a plurality of clutch mechanisms, which is under immediate control of the operator, and which may be readily shifted to various positions for positively selecting and operating a predetermined set of mechanisms for controlling clutching elements forming part of the transmission gearing of a traction engine.

The provision of a single simply operable lever capable of a multiplicity of movements each designed for positive action on a plurality of mechanisms forming part of a traction engine is of great importance during the operation thereof, when it is understood that the attention of the operator must be constantly given to the observation of his machinery and the manipulation of its many intricate mechanisms.

I claim as my invention:

1. In controlling means for transmission mechanism, the combination of a frame embodying a substantially medianly mounted wall, arms pivotally mounted on said frame, rods connected to said arms, movable controlling members associated with said arms and adapted to travel along opposite sides of said wall and having locking means adapted to engage said wall, and a reversibly and laterally movable lever mounted in said frame the free end whereof is adjustable to engage either of said members and disengage said locking means to permit said members to be actuated by said lever to impart motion to said rods.

2. In controlling means for transmission mechanism, a frame, an arm mounted in said frame, a movable lever-engaging member mounted on said arm said member having locking mechanism associated therewith, means with which said locking mechanism engages to retain said member in predetermined position, and a movable lever the free end of which is adapted to engage said member and release said locking mechanism to permit said member to be actuated by said lever.

In testimony whereof I affix my signature in presence of two witnesses.

FRANK LAND.

Witnesses:
A. J. DONOVAN,
L. J. FRANCISCO.